United States Patent
Burstein et al.

(10) Patent No.: US 7,360,193 B1
(45) Date of Patent: Apr. 15, 2008

(54) METHOD FOR CIRCUIT BLOCK PLACEMENT AND CIRCUIT BLOCK ARRANGEMENT BASED ON SWITCHING ACTIVITY

(75) Inventors: Michael Burstein, Cupertino, CA (US); Mikhail Komorov, Moscow (RU); Georgy Sergeev, Moscow (RU)

(73) Assignee: Golden Gate Technology, Inc., San Jose, CA (US)

( * ) Notice: Subject to any disclaimer, the term of this patent is extended or adjusted under 35 U.S.C. 154(b) by 371 days.

(21) Appl. No.: 10/946,925

(22) Filed: Sep. 21, 2004

(51) Int. Cl.
*G06F 17/50* (2006.01)
*G06F 9/45* (2006.01)
*G06F 9/455* (2006.01)

(52) U.S. Cl. .................. 716/10; 716/9; 716/6
(58) Field of Classification Search .............. 716/9–10, 716/6
See application file for complete search history.

(56) References Cited

U.S. PATENT DOCUMENTS

| | | | |
|---|---|---|---|
| 6,230,304 B1 | 5/2001 | Groeneveld et al. | |
| 6,253,361 B1 | 6/2001 | Buch | |
| 6,321,183 B1 * | 11/2001 | Tatsumi ....................... | 703/14 |
| 6,453,446 B1 | 9/2002 | Van Ginneken | |
| 6,496,965 B1 | 12/2002 | Van Ginneken et al. | |
| 6,507,941 B1 | 1/2003 | Leung et al. | |
| 6,530,065 B1 * | 3/2003 | McDonald et al. ............ | 716/4 |
| 6,553,338 B1 | 4/2003 | Buch et al. | |
| 6,662,348 B1 * | 12/2003 | Naylor et al. .................. | 716/9 |
| 6,725,438 B2 | 4/2004 | Van Ginneken | |

(Continued)

OTHER PUBLICATIONS

Jim Flynn and Brandon Waldo; Power Management in Complex SoC Design (16 Pages); Apr. 2004; Synopsis, Inc., 700 East Middlefield Rd., Mountain View, CA 94043; http://www.synopsys.com/sps.

(Continued)

*Primary Examiner*—Paul Dinh
*Assistant Examiner*—Suresh Memula
(74) *Attorney, Agent, or Firm*—Andrew D. Fortney; Alec B. Plumb

(57) ABSTRACT

A method, algorithm, software, architecture and/or system for placing circuit blocks and/or routing wires in a circuit design is disclosed. In one embodiment, a method of placing can include: (i) determining a first signal path between first and second circuit blocks and determining a second signal path between first and third circuit blocks; and (ii) placing the first circuit block relative to the second and third circuit blocks in a position related to a switching activity of the first and second signal paths. The circuit blocks can include standard cells configured to implement a logic function, other components, or integrated circuits, for example. The switching activity can include a switching frequency determination based on simulation results of the first and second signal paths between the circuit blocks. Embodiments of the present invention can advantageously reduce power consumption as well as supply noise by optimally placing circuit blocks in an automated place-and-route flow. Further, signal integrity problems due to non-optimal circuit block or component placement can be minimized.

25 Claims, 4 Drawing Sheets

U.S. PATENT DOCUMENTS

| | | | |
|---|---|---|---|
| 6,950,998 B1 * | 9/2005 | Tuan | 716/2 |
| 7,062,425 B1 * | 6/2006 | Bell et al. | 703/14 |
| 2004/0015803 A1 * | 1/2004 | Huang et al. | 716/10 |
| 2004/0049747 A1 * | 3/2004 | Yamasaki et al. | 716/4 |
| 2004/0073878 A1 * | 4/2004 | Hasegawa et al. | 716/8 |
| 2004/0150422 A1 * | 8/2004 | Wong | 326/41 |
| 2004/0199883 A1 * | 10/2004 | Palumbo | 716/4 |
| 2005/0034091 A1 * | 2/2005 | Harn | 716/6 |
| 2006/0031795 A1 * | 2/2006 | Rahmat et al. | 716/5 |

OTHER PUBLICATIONS

Astro-Rail: A Comprehensive Power-Integrity Analysis, Implementation and Verfication Tool (2 Pages); Data Sheet, May 2003; Synopsis, Inc., 700 East Middlefield Rd., Mountain View, CA 94043.

* cited by examiner

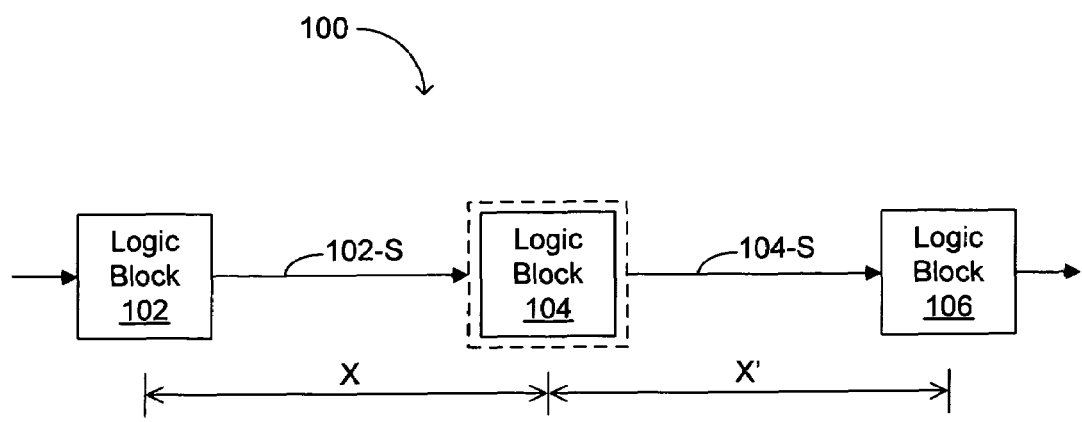
FIG. 1 (conventional)

METHOD FOR CIRCUIT BLOCK PLACEMENT AND CIRCUIT BLOCK ARRANGEMENT BASED ON SWITCHING ACTIVITY

FIELD OF THE INVENTION

The present invention generally relates to the field of circuit design, particularly integrated circuit (IC) design. More specifically, embodiments of the present invention pertain to methods, algorithms, software, systems and architectures for reducing power consumption and improving signal integrity in the design of an IC.

DISCUSSION OF THE BACKGROUND

In typical circuit design, circuit components are arranged to optimize space and/or circuit performance. Such arrangements can include the "layout" or pattern definition of each of the layers used in a semiconductor manufacturing process. For example, such layout can include metal interconnect layers that are converted to masks or reticles for use in a wafer fabrication facility that manufactures ICs (i.e., "chips").

While some circuits are designed using "custom" layout, others are designed using a partially or fully automated design flow. Application-Specific Integrated Circuit (ASIC) designs, as well as other functional blocks within a larger chip, such as System-On-Chip (SOC) designs, may employ custom and/or ASIC type flows on the same chip. In any event, typical ASIC flows use "place-and-route" tools for placing logic or circuit "blocks" and then "routing" or connecting the interface signals between the blocks.

Referring now to FIG. 1, a box diagram of a circuit block placement resulting from the use of conventional placement tools is shown and indicated by the general reference character 100. Logic Block 102 can interface to Logic Block 104 via signal 102-S. Similarly, Logic Block 104 can interface to Logic Block 106 via signal 104-S. In this example, Logic Block 102 and Logic Block 106 are initially placed by the conventional placement tool. Then, Logic Block 104 is placed. Because of interfaces to both Logic Block 102 and Logic Block 106, the conventional placement tool will place Logic Block 104 either arbitrarily or substantially in the middle between Logic Blocks 102 and 106 (i.e., distance X is about equal to distance X'). One conventional approach, for example, uses a summation of the squares in the interface signal paths to determine the middle location for the placement of Logic Block 104.

However, such conventional approaches to automated block placement are not optimized for power consumption or signal integrity concerns. Limitations of such conventional approaches result from the fact that the switching frequency of signal 102-S is not likely to be the same as that of signal 104-S. Accordingly, the placement of Logic Block 104 substantially in the middle between Logic Blocks 102 and 106 does not necessarily minimize the power being drawn or the supply noise in the situation where the switching frequencies are not equal.

Given the increasing demands on circuit designers to create chips of increasing density, decreasing wire and transistor widths, and decreasing power supply and power consumption, it is difficult to ensure optimal circuit block placement, particularly in an automated placement flow. Increasing the complexity, flexibility and/or functionality of the circuitry on a chip exacerbates these challenges. Thus, what is needed is a tool with which integrated circuit designers can automatically optimize circuit placement so as to reduce power consumption and increase signal integrity.

SUMMARY OF THE INVENTION

Embodiments of the present invention relate to methods, algorithms, software, architectures and/or systems for placing circuit blocks and/or routing wires in a circuit design.

In one embodiment, a method of placing can include: (i) determining a switching activity for (1) a first signal path between a first circuit block and a second circuit block and (2) a second signal path between the first circuit block and a third circuit block; and (ii) placing the first circuit block relative to the second and third circuit blocks in a position related to a switching activity of the first and second signal paths. The circuit blocks can include standard cells configured to implement a logic function, other components, or integrated circuits, for example. The switching activity can include a switching frequency determination based on simulation results of the first and second signal paths between the circuit blocks.

Embodiments of the present invention can advantageously reduce power consumption as well as supply noise by optimally placing circuit blocks in an automated place-and-route flow. Further, signal integrity problems due to non-optimal circuit block or component placement can be minimized relative to placing the circuit blocks by a summation of the squares (or "middle placement") technique. Embodiments of the invention are suitable for the automated placement of circuit blocks within an integrated circuit (IC) and/or placements of ICs or components on a board, such as a printed circuit board (PCB).

These and other advantages of the present invention will become readily apparent from the detailed description of preferred embodiments below.

BRIEF DESCRIPTION OF THE DRAWINGS

FIG. 1 is a box diagram of a circuit block placement resulting from the use of conventional placement tools.

DETAILED DESCRIPTION OF THE PREFERRED EMBODIMENTS

Figure 2:
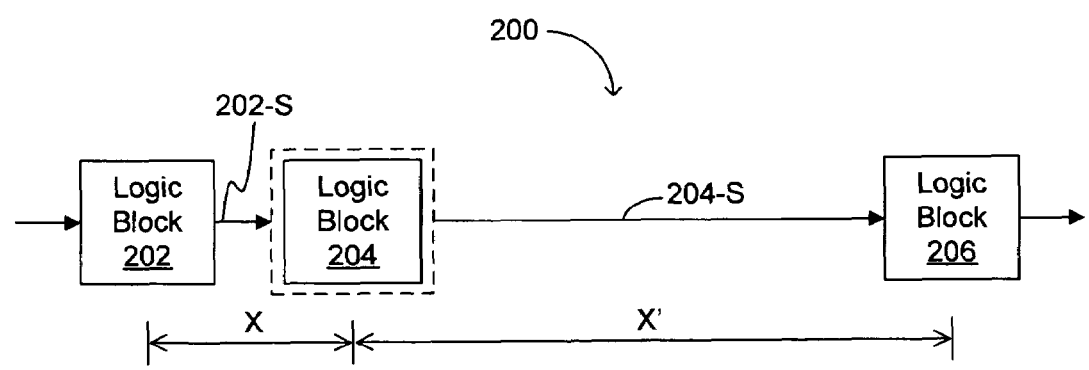
FIG. 2 is a box diagram of circuit block placement resulting from the use of an embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on code, data bits, data streams or waveforms within a computer, processor, controller and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like, and to their representations in computer programs or software as code (which may be object code, source code or binary code).

It should be borne in mind, however, that all of these and similar terms are associated with the appropriate physical quantities and/or signals, and are merely convenient labels applied to these quantities and/or signals. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer or data processing system, or similar processing device (e.g., an electrical, optical, or quantum computing or processing device), that manipulates and transforms data represented as physical (e.g., electronic) quantities. The terms refer to actions and processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, in the context of this application, the terms "net list" (or "netlist") and "hardware description" may be used interchangeably to refer to a circuit design represented in an appropriate language, such as VERILOG simulation language, Hardware Description Language (HDL) or VERILOG HDL (VHDL; VERILOG is a registered trademark of Gateway Design Automation Corporation for computer aided electrical engineering programs). Similarly, the terms "wire," "wiring," "line," "signal," "conductor" and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Similarly, for convenience and simplicity, the terms "clock," "time," "timing," "rate," "period" and "frequency" are, in general, interchangeable and may be used interchangeably herein, but are generally given their art-recognized meanings. Also, for convenience and simplicity, the terms "data," "data stream," "waveform" and "information" may be used interchangeably, as may (a) the terms "flip-flop," "latch" and "register," and (b) the terms "connected to," "coupled with," "coupled to," and "in communication with," but these terms are generally given their art-recognized meanings herein.

The present invention concerns a method and/or algorithm (e.g., a computer-readable set of instructions) for placing circuit blocks, and can include: (i) determining switching activities for a first signal path between first and second circuit blocks and a second signal path between first and third circuit blocks; and (ii) placing the first circuit block relative to the second and third circuit blocks in a position related to a switching activity of the first and second signal paths. The circuit blocks can include standard cells configured to implement a logic function, other components, or integrated circuits, for example. The switching activity can include a switching frequency determination based on simulation results of the first and second signal path between the circuit blocks.

In a further aspect of the invention, the software relates to a medium or waveform containing a computer-readable set of instructions, where the instructions can include: (i) determining a first weighting of a first signal path between first and second circuit blocks and a second weighting of a second signal path between first and third circuit blocks; and (ii) placing the first circuit block relative to the second and third circuit blocks in a position related to the first and second weightings. The weightings can each include a switching activity factor for each of the signal paths.

In another aspect of the invention, a method and/or algorithm of arranging can include: (i) placing first and second circuit blocks; (ii) determining whether a third circuit block interfaces with the first and second circuit blocks; and (iii) if the third circuit block interfaces with the first and second circuit blocks, then: accessing switching activity information for signal paths connecting the third circuit block to the first and second blocks; and placing the third circuit block relative to the first and second circuit blocks in a position related to the switching activity information for the signal paths.

In another aspect of the invention, an arrangement of circuit blocks can include: (i) a first circuit block in a first position and coupled to a third circuit block via a first signal path; (ii) a second circuit block in a second position and coupled to the third circuit block via a second signal path; and (iii) the third circuit block in a third position, the third position being based at least in part on the relative switching activities of the first and second signal paths.

Embodiments of the present invention can advantageously reduce power consumption as well as supply noise by optimally placing circuit blocks in an automated place-and-route flow. Further, signal integrity problems due to non-optimal circuit block or component placement can be minimized. Embodiments of the invention are suitable for the automated placement of circuit blocks within an integrated circuit (IC) and/or placements of ICs or components on a board, such as a printed circuit board (PCB).

The invention further relates to hardware and/or software implementations of the present architecture, method and system. The invention, in its various aspects, will be explained in greater detail below with regard to exemplary embodiments.

Referring now to FIG. 2, a box diagram of circuit block placement resulting from the use of an embodiment of the present invention is shown and indicated by the general reference character 200. Logic Block 202 can interface to Logic Block 204 via signal or "signal path" 202-S. Logic Block 204 can also interface to Logic Block 206 via signal 204-S. In this example, the switching activity of signal 202-S may be higher than the switching activity of signal 204-S. For example, signal 202-S may switch state (i.e., from a "high" or "1" to a "low" or "0" or vice versa) ten times in a given time period. However, in that same given time period, signal 204-S may only switch state one time. Because the current drawn from the power supply is proportional to the capacitive load being driven, it is typically desirable to minimize capacitive loads, particularly on signals that may switch states often (i.e., high "switching activity" signals). According to embodiments of the present invention, the switching activity of signal 202-S can be determined and compared with that of signal 204-S so as to identify a relative position for the placement of Logic Block 204. Thus, in this example, distance X is less than distance X', so as to reduce the capacitance of signal path 202-S, as indicated. Moreover, Logic Block 204 may be placed substantially adjacent to or otherwise in proximity with Logic Block 202.

Of course, as one skilled in the art will recognize, embodiments of the present invention are also applicable to analog, ternary, or other non-digital circuits. As one example, "small-signal" circuits, either alone or embedded within a larger chip or PCB may employ embodiments of the present invention. In general, embodiments of the present invention can be used in the placement of circuit blocks having interface signals that change states. Further, such state changes suitable for a "switching activity" determination may be of any type (e.g., analog, digital, etc.) recognizable by the interfacing or surrounding circuitry.

In this fashion, a circuit or logic block can be placed in a relative position based on the switching activity of associated signals. Accordingly, the capacitance of signal paths for certain higher switching activity signals can typically be reduced. Thus, the overall power consumption of a circuit can effectively be reduced by the use of embodiments of the present invention. In one implementation, a power reduction of about 15-20% was realized. Further, signal integrity problems can also be minimized due to increased power supply stability.

Figure 3:
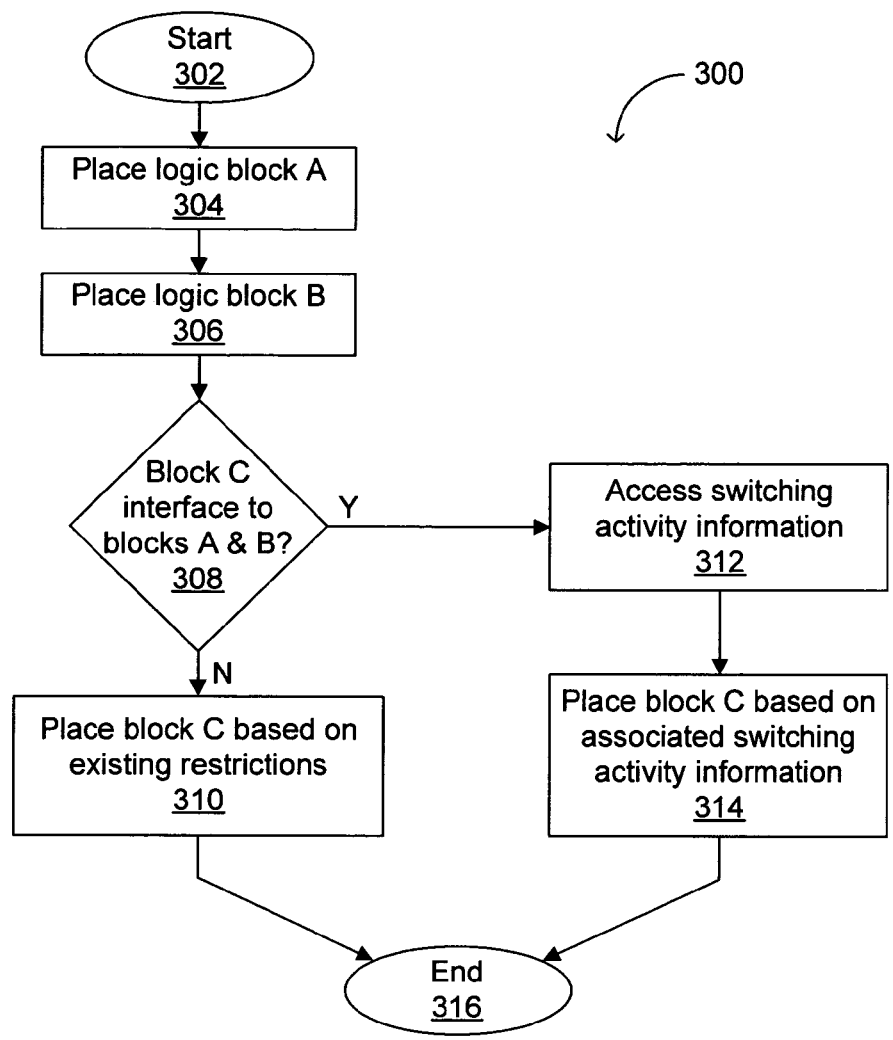
FIG. 3 is a flow diagram showing a circuit block placement method according to an embodiment of the present invention.

Referring now to FIG. 3, a flow diagram showing a circuit block placement method according to an embodiment of the present invention is indicated by the general reference character 300. The flow can begin in Start 302 and a logic block "A" can be placed (304). Logic block "B" can be placed in 306. In this example, logic blocks A and B may be placed using conventional placement restrictions, such as placement within designated areas or regions on a chip floorplan. Of course, while the placing of logic block B (306) is shown in FIG. 3 as a sequential operation to the placing of logic block A (304), one skilled in the art will recognize that no sequential dependency is implied. In fact, logic block B could be placed prior to logic block A or logic blocks A and B could be placed simultaneously. Next, it can be determined whether the next block to be placed (logic block "C") interfaces to the already-placed logic blocks A and B (308). Such a determination of an "interface" between logic blocks can be made by reference to a "netlist" file. Netlist files can be generated, for example, by a synthesizer based on a Hardware Description Language (HDL) representation of the logic functions of a circuit (which generally includes logic blocks A, B and C), as will be discussed in more detail below with reference to FIG. 5.

In FIG. 3, if logic block C does not interface to logic blocks A and B, then block C can be placed based on existing or conventional restrictions (310) and the flow can complete in End 316. For example, if block C interfaces to block A, but not block B, then logic block C may be placed in the region of block A, but not necessarily between blocks A and B. Similarly, if block C interfaces to block B, but not block A, then logic block C may be placed in the region of block B, but not necessarily between blocks A and B. Such placements may of course be subject to overriding restrictions, such as placement within designated areas or regions on a chip floorplan.

If it is determined that logic block C does interface to already-placed logic blocks A and B, then associated switching activity information can be accessed (312). Such switching activity information can include a switching frequency based on an event-driven simulation, such as a VERILOG simulation. Further, the switching activity information can include a user-controlled factor that may be multiplied with a switching activity (i.e., switching frequency) factor. Next, logic block C can be placed in a relative position based on associated switch activity information (314) and the flow can complete in End 316. The placement of block C in a relative position between, or in proximity with at least one of, blocks A and B can be determined by formula (1), as follows:

$$\text{weight(net)} = \text{length(net)} + P * Sw(\text{net}) \quad (1)$$

The result term "weight(net)" can be a weighting so as to designate the relative position of the new block placement. The term "length(net)" can be an initial length of a signal path, such as may be determined by conventional placement approaches. Alternatively, "length(net)" can represent a current or a projected length of a signal path. The term "P" in the above formula may be the user-controlled factor. The user-controlled factor can be a representation of the importance or priority of a particular signal path relative to other signal paths. For example, a clock signal may have a high priority designation by a user. Further, the term "Sw(net)" can be a switching frequency or switching activity term, for example. As discussed above, this term can be determined by way of simulation of a netlist representation of the overall circuit, for example.

The weighting ("weight(net)") can be used to determine the relative position of a new block placement with respect to existing block placements, such as Logic Block 204 relative to Logic Blocks 202 and 206, as discussed above with reference to FIG. 2. Accordingly, distance X versus distance X' can be determined by accessing the weighting for "nets" or signal paths 202-S and 204-S, for example. In this fashion, a circuit block can be placed in a relative position based on the switching activity of associated signals. Further, the placement can further be dependent on a user-controlled factor as well as an initial and/or projected signal path length.

Figure 4A:
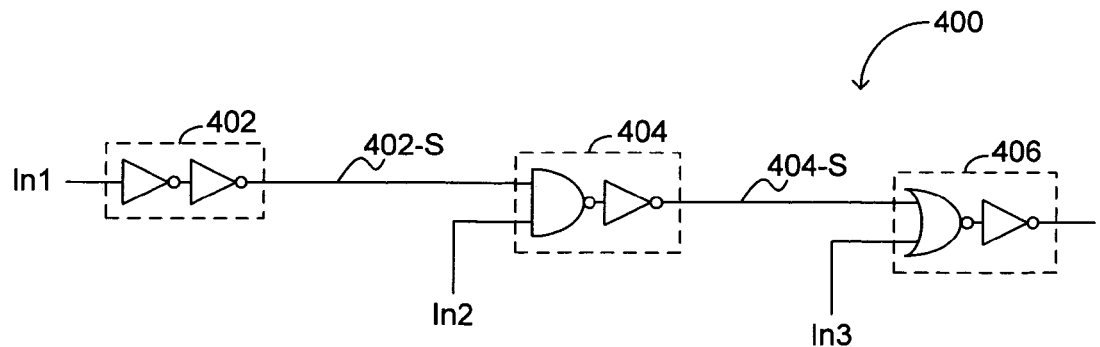
FIG. 4A is schematic diagram showing an exemplary circuit that may be used in embodiments of the present invention.

Referring now to FIG. 4A, a schematic diagram showing an exemplary circuit that may be used in embodiments of the present invention is indicated by the general reference character 400. This example shows a simple circuit structure using standard cells or gates to implement logic or other functions that is suitable for IC design. Such logic functions could include AND/NAND, OR/NOR, XOR/XNOR, INV, or flip-flops, as just a few examples. In practice, any circuit can be designed and treated as a "standard cell" for automatic placement and routing in a larger design. More commonly, a set of standard cells are provided and characterized for each design technology and are utilized in an "off-the-shelf" manner in a typical ASIC design flow.

Figure 4B:
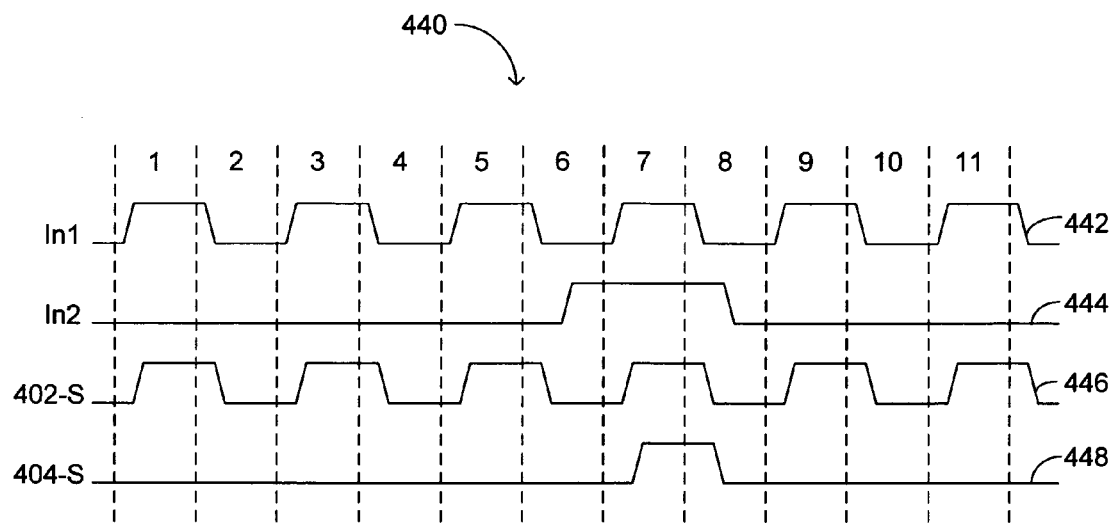
FIG. 4B is an example timing diagram for the circuit of FIG. 4A.

In the example of FIG. 4A, standard cell 402 can be a buffer stage receiving input In1 and outputting signal 402-S. Standard cell 404 can be an "AND" function having a NAND-gate followed by an inverter. Standard cell 404 can receive signal 402-S and input In2 and can output signal 404-S. Standard cell 406 can be an "OR" function having a NOR-gate followed by an inverter. Standard cell 406 can receive signal 404-S and input In3. Particularly if standard cells 402 and 406 are placed first, embodiments of the present invention can be used to determine a relative placement of standard cell 404. Consistent with such embodiments, a simulation of circuit 400 may be done to determine the switching activity of signals 402-S and 404-S Referring now to FIG. 4B, an example timing diagram for the circuit of FIG. 4A is shown and indicated by the general reference character 440. Such a timing diagram can be a waveform representation of a VERILOG simulation result, such as a Value Change Data (VCD) file, for example. Input In1 (waveform 442) can be an oscillating signal, such as a clock, and may go high (i.e., transition from "0" to "1") in odd cycles and go low (i.e., transition from "1" to "0") in even cycles. Input In2, which may be a clock enable signal, for example, can go high in cycle 6 and go low in cycle 8, as shown by waveform 444. Signal 402-S (waveform 446) can be a simple delay of In1 because signal 402-S is the output of buffer stage 402. Signal 404-S can go high in cycle 7 and go low in cycle 8 to reflect the "AND" function of standard cell 404. Thus, over the time period of 11 cycles shown in FIG. 4B, the switching activity of signal 402-S is six times the switching activity of signal 404-S (i.e., six full switching cycles for 402-S versus only one switching cycle for 404-S).

The switching activity of various signals in a circuit, where that circuit has been simulated, can also be determined using a commercially available or custom software tool. For example, if the circuit simulation is done using VERILOG simulation language, a VCD file can be created as an output file. A switching activity interface (SAIF) can be used to determine the switching activity of each signal or "net" in the circuit. An example of a free utility for conversion of a VCD output to SAIF is the "vcd2saif" script, which is available from Synopsys, Inc., of Mountain View, Calif. (www.synopsys.com; in particular, see www.synopsys.com/partners/tapin/saif.html).

Figure 4C:
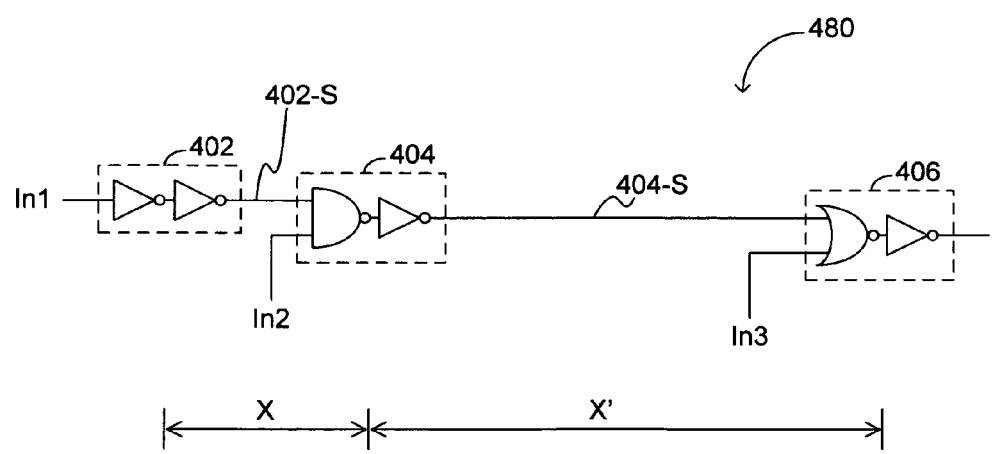
FIG. 4C is a schematic diagram showing a relative placement of circuit block portions of the circuit of FIG. 4A resulting from the use of embodiments of the present invention.

Referring now to FIG. 4C, a schematic diagram showing a relative placement of circuit block portions of the circuit of FIG. 4A resulting from the use of embodiments of the present invention is indicated by the general reference character 480. Based on the switching activity of signals 402-S and 404-S in the above example, standard cell 404 can be placed relatively close to standard cell 402. Thus, distance X can be substantially less than distance X' and the capacitance of signal path 402-S can accordingly be less than the capacitance of signal path 404-S. In this fashion, power consumption due to driving the relatively high switching frequency signal 402-S can be minimized. Further, the signal integrity of all signals affected by localized power supply noise in the region of standard cell 402 can be improved because such noise can be minimized according to embodiments of the present invention.

While the exemplary circuit block arrangements discussed above generally show the placement of a third circuit block where two other circuit blocks interfacing to the third block have already been placed, these illustrations should not be considered limiting. As one skilled in the art will recognize, three or more previously-placed circuit blocks may have signals that interface to a new block to be placed and embodiments of the present invention are equally adaptable to such applications. In one embodiment, such a new block may be placed in accordance with a two-dimensional average relative position based on associated signal switching activities. In any event, in accordance with embodiments of the present invention, the new block may be placed relative to or in proximity with previously-placed circuit blocks in relation to the switching activity of the associated interface signals.

Figure 5:
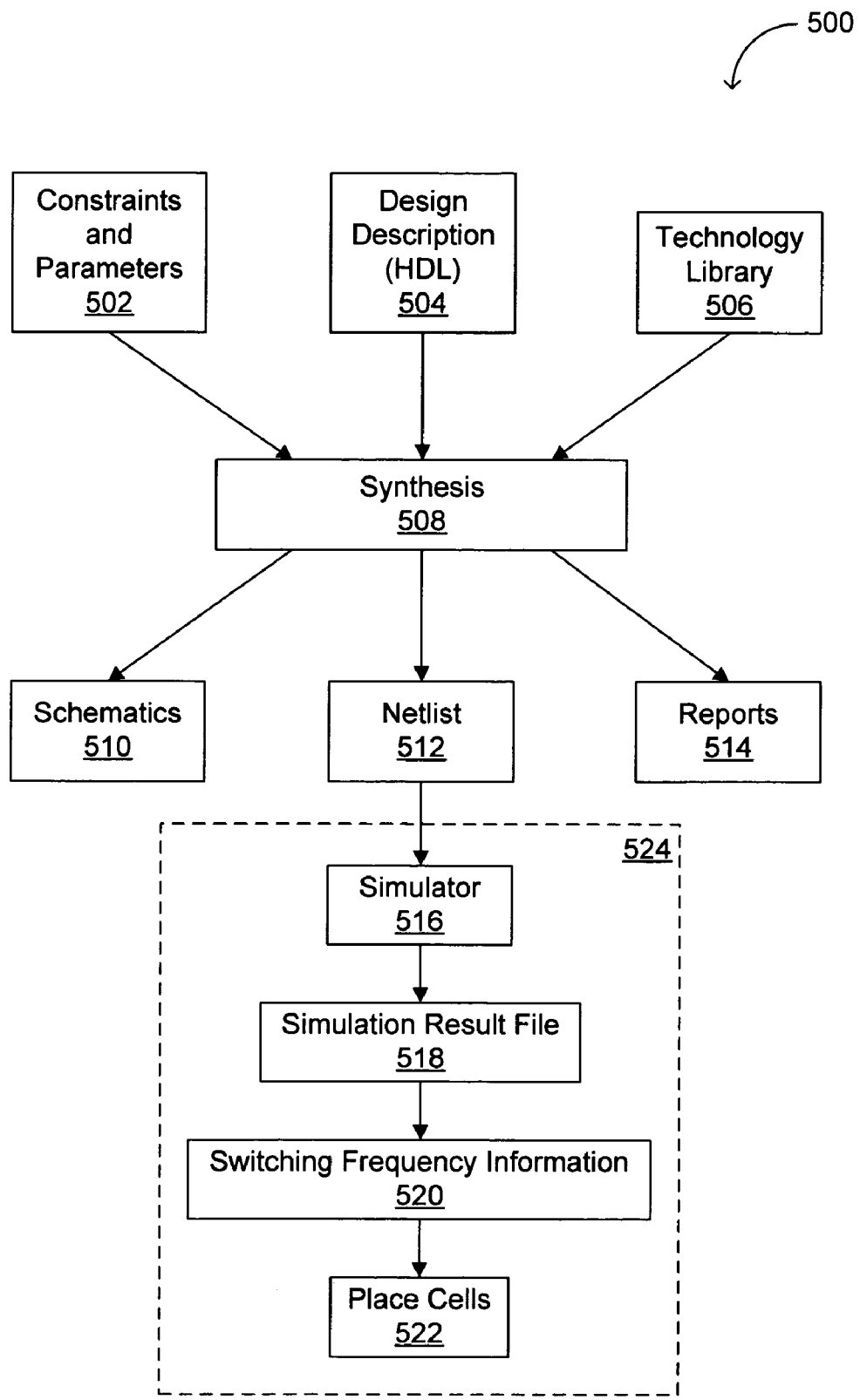
FIG. 5 is a box diagram showing a synthesis flow adapted for use with embodiments of the present invention.

Referring now to FIG. 5, a box diagram showing a synthesis flow adapted for use with embodiments of the present invention is indicated by the general reference character 500. Box 524 shows elements adapted for use in accordance with embodiments of the present invention. The remaining boxes in FIG. 5 represent a conventional synthesis flow. Inputs to Synthesis 508 typically include Constraints and Parameters 502, Design Description (HDL) 504, and Technology Library 506. Constraints and Parameters 502 may include physical expectations of the design, such as the circuit operating speed and/or the circuit layout area. Design Description (HDL) 504 can be a VERILOG HDL (VHDL) description of the logic operation(s) for synthesis. Technology Library 506 may contain a functional description as well as other information, such as may be related to the area and speed of all standard cells in a given process technology. For example, Technology Library 506 may be specific to a technology generation (e.g., 0.18 micron technology), a company (e.g., TSMC), and a process type (e.g., CMOS; triple-level metal; fast/normal/slow lot variation).

Outputs from Synthesis 508 may include Schematics 510, Netlist 512, and Reports 514. Schematics 510 can be schematic representations of the synthesized functions of Design Description (HDL) 504. Netlist 512 can be a text file description of a physical connection of components, such as standard cells, and can include a description of the various circuit blocks in the design and signal paths between the circuit blocks. Reports 514 can include speed and area data associated with results of Synthesis 508.

As discussed above, a netlist representation (e.g., Netlist 512) may be used for simulation to determine the switching activity of various signals. Accordingly, Simulator 516 can receive Netlist 512 and provide Simulation Result File 518. For example, Simulator 516 can be a VERILOG simulator and Simulation Result File 518 can be a VCD file. Simulation Result File 518 can be used to determine Switching Frequency Information 520. As discussed above, this can be accomplished by the use of a "vcd2saif" utility, for example. Finally, Place Cells 522 can receive Switching Frequency Information 520 so as to make placements based on the switching activity of associated signals.

In this fashion, a conventional ASIC type design flow including synthesis can be adapted for placement of standard cells in accordance with embodiments of the present invention. Alternatively, embodiments of the present invention may be used in other design flows whereby a switching activity of signals can be determined via simulation or other means.

Further examples of suitable systems, tools and/or methods in which the present invention is generally applicable include those described in, e.g., U.S. Pat. Nos. 6,080,201 and 5,798,936, the relevant portions of which are each incorporated herein by reference, and those commercially available from place-and-route software vendors such as Cadence Design Systems (e.g., the SILICON ENSEMBLE™, SILICON ENSEMBLE-PKS™, FIRST ENCOUNTER™, and NANO ENCOUNTER™ tools), Silicon Valley Research, Inc. (e.g., the QIC/APR™, GARDS™, SC™ and FLOORPLACER™ tools), Synopsys (e.g., the CHIP ARCHITEC™, DESIGN COMPILER™, and FLOORPLAN COMPILER™ tools) and Mentor Graphics (e.g., the AUTOCELLS™ tool).

Thus, embodiments of the present invention can advantageously reduce power consumption as well as supply noise by optimally placing circuit blocks in an automated place-and-route flow. Further, signal integrity problems due to non-optimal circuit block or component placement can be minimized. Embodiments of the invention are suitable for the automated placement of circuit blocks within an IC and/or placements of ICs or components on a board, such as a printed circuit board (PCB).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of placing, comprising the steps of:
   a) determining a first signal path length and a first switching activity for a first signal path between a first circuit block and a second circuit block and a second signal path length and a second switching activity for a second signal path between said first circuit block and a third circuit block;
   b) determining a first weighting by multiplying said first switching activity by a first user-controlled factor to form a first result and adding said first result to said first signal path length and a second weighting by multiplying said second switching activity by a second user-controlled factor to form a second result and adding said second result to said first signal path length;
   c) placing said second and third circuit blocks prior to placing said first circuit block; and
   d) placing said first circuit block relative to said second and third circuit blocks in a position related to said first weighting and said second weighting.

2. The method of claim 1, wherein the step of determining said first weighting and said second weighting occurs prior to the step of placing said first circuit block.

3. The method of claim 1, further including the step of determining said first and second signal paths.

4. The method of claim 3, wherein the step of determining said first and second signal paths includes matching said first and second signal paths to a corresponding two of a plurality of nets in a netlist describing said first, second and third circuit blocks.

5. The method of claim 4, wherein the step of determining said switching activity includes simulating using said netlist.

6. The method of claim 5, wherein said simulating includes an event-based logic simulation.

7. The method of claim 6, wherein said event-based logic simulation includes a VERILOG simulation.

8. The method of claim 5, wherein the step of determining said switching activity further includes converting an output file from the simulating step to a switching activity file.

9. The method of claim 8, wherein said switching activity file includes a frequency of switching for each signal path over a predetermined time period.

10. The method of claim 9, wherein the step of placing includes placing said first circuit block closer to said second circuit block if the frequency of switching for said first signal path is greater than the frequency of switching for said second signal path.

11. The method of claim 1, wherein each of the circuit blocks includes a standard cell configured to implement a logic or timing function.

12. The method of claim 11, further including the step of accessing a technology library having a characterization of said standard cell.

13. The method of claim 1, wherein said position is automatically determined by said weighting.

14. The method of claim 1, further including the step of synthesizing a circuit implementation in response to a hardware description.

15. The method of claim 1, wherein each of the circuit blocks includes an integrated circuit or component.

16. The method of claim 1, wherein determining said switching activity for said first signal path comprises determining a frequency of state changes in a signal on said first signal path and determining said switching activity for said second signal path comprises determining a frequency of state changes in a signal on said second signal path.

17. A computer readable medium comprising a computer executable set of instructions adapted to perform the steps of:
   a) determining a first signal path length and a first switching activity factor of a first signal path between first and second circuit blocks and a second signal path length and a second switching activity factor of a second signal path between first and third circuit blocks;
   b) determining a first weighting by multiplying said first switching activity factor by a first user-controlled factor to form a first result and adding said first result to said first signal path length and a second weighting by multiplying said second switching activity factor by a second user-controlled factor to form a second result and adding said second result to said first signal path length; and
   c) placing said first circuit block relative to said second and third circuit blocks in a position related to said first weighting and said second weighting.

18. The medium of claim 17, wherein the step of determining said first and second signal paths occurs prior to the step of placing.

19. The medium of claim 18, wherein the step of determining said first and second signal paths includes matching said first and second signal paths to a corresponding two of a plurality of nets in a netlist describing said first, second and third circuit blocks.

20. The medium of claim 19, wherein the step of determining said first and second switching activity factors includes simulating using said netlist.

21. The medium of claim 17, wherein each of the circuit blocks includes a standard cell configured to implement a logic function.

22. The medium of claim 17, further including at least one instruction for synthesizing a circuit implementation in response to a hardware description.

23. The medium of claim 17, wherein each of the circuit blocks includes an integrated circuit or component.

24. A computer system comprising the medium of claim 17, configured to execute said instructions.

25. The method of claim 17, wherein determining said switching activity for said first signal path comprises determining a frequency of state changes in a signal on said first signal path and determining said switching activity for said second signal path comprises determining a frequency of state changes in a signal on said second signal path.

* * * * *

UNITED STATES PATENT AND TRADEMARK OFFICE
CERTIFICATE OF CORRECTION

PATENT NO. : 7,360,193 B1  
APPLICATION NO. : 10/946925  
DATED : April 15, 2008  
INVENTOR(S) : Michael Burstein et al.

Page 1 of 1

It is certified that error appears in the above-identified patent and that said Letters Patent is hereby corrected as shown below:

IN THE CLAIMS:

Claim 1, col. 9, line 55: change "adding said second result to said first signal path length" to --adding said second result to said second signal path length--.

Claim 17, col. 10, line 55: change "adding said second result to said first signal path length" to --adding said second result to said second signal path length--.

Signed and Sealed this  
Twenty-first Day of June, 2011

David J. Kappos  
*Director of the United States Patent and Trademark Office*